United States Patent
Eichhorn

(10) Patent No.: US 9,567,008 B2
(45) Date of Patent: Feb. 14, 2017

(54) DISPLAY DEVICE FOR A VEHICLE FOR INDICATING UPCOMING AUTOMATICALLY PERFORMED STEERING INTERVENTIONS IN A VEHICLE

(71) Applicant: Bayerische Motoren Werke Aktiengesellschaft, Munich (DE)

(72) Inventor: Julian Eichhorn, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/933,297

(22) Filed: Nov. 5, 2015

(65) Prior Publication Data

US 2016/0052549 A1    Feb. 25, 2016

Related U.S. Application Data

(63) Continuation of application No. PCT/EP2014/058707, filed on Apr. 29, 2014.

(30) Foreign Application Priority Data

May 6, 2013  (DE) .................. 10 2013 208 206

(51) Int. Cl.
*B62D 15/02*    (2006.01)
*B60K 35/00*    (2006.01)
(Continued)

(52) U.S. Cl.
CPC ............ *B62D 15/029* (2013.01); *B60K 35/00* (2013.01); *B60W 30/10* (2013.01); *B60W 30/12* (2013.01);
(Continued)

(58) Field of Classification Search
CPC .................. B60K 2350/928; B60K 2350/352; B60K 2350/405; B60K 2350/407; B60K 37/06; B60Q 1/0082
(Continued)

(56) References Cited

U.S. PATENT DOCUMENTS 5,666,102 A    9/1997  Lahiff
8,346,426 B1   1/2013  Szybalski et al.
(Continued)

FOREIGN PATENT DOCUMENTS

DE    199 47 266 A1    7/2000
DE    103 52 733 A1    10/2004
(Continued)

OTHER PUBLICATIONS

International Search Report (PCT/ISA/210) issued in PCT Application No. PCT/EP2014/058707 dated Oct. 28, 2014 with English translation (six (6) pages).

(Continued)

*Primary Examiner* — Dalena Tran
(74) *Attorney, Agent, or Firm* — Crowell & Moring LLP

(57) ABSTRACT

A display device for a vehicle indicates upcoming automatically performed steering interventions. The display device includes a vehicle steering wheel; a light strip comprising a plurality of light elements positioned one alongside another, the light strip being formed in the vehicle steering wheel and being visible therein; and a control device that is coupled to the light strip and is configured to receive information regarding upcoming automatically performed steering interventions, particularly from a unit for automatically determining upcoming driving maneuvers, and activate light elements of the light strip on the basis of the received information on upcoming steering interventions.

12 Claims, 3 Drawing Sheets

(51) Int. Cl.
*B60W 30/10* (2006.01)
*B60W 30/12* (2006.01)
*B60W 50/14* (2012.01)

(52) U.S. Cl.
CPC ............ *B60W 50/14* (2013.01); *B62D 15/025* (2013.01); *B62D 15/0255* (2013.01); *B60K 2350/928* (2013.01); *B60W 2050/146* (2013.01)

(58) Field of Classification Search
USPC .... 701/41, 42, 36; 340/438, 459, 456, 932.2
See application file for complete search history.

(56) References Cited

U.S. PATENT DOCUMENTS

| | | | | |
|---|---|---|---|---|
| 8,874,321 | B2* | 10/2014 | Nada | B60K 35/00 348/148 |
| 2006/0070795 | A1 | 4/2006 | Meissner | |
| 2008/0061954 | A1* | 3/2008 | Kulas | B60K 35/00 340/438 |
| 2008/0143505 | A1 | 6/2008 | Maruyama et al. | |
| 2008/0211651 | A1 | 9/2008 | Beutnagel-Buchner et al. | |
| 2009/0273458 | A1* | 11/2009 | Almqvist | A61B 5/18 340/439 |
| 2009/0319095 | A1 | 12/2009 | Cech et al. | |
| 2013/0124041 | A1 | 5/2013 | Belser et al. | |

FOREIGN PATENT DOCUMENTS

| | | |
|---|---|---|
| DE | 103 24 812 A1 | 12/2004 |
| DE | 103 46 691 A1 | 5/2005 |
| DE | 10 2007 060 347 A1 | 6/2008 |
| DE | 10 2009 003 194 A1 | 11/2010 |
| DE | 10 2009 059 670 A1 | 6/2011 |
| DE | 10 2010 002 105 A1 | 8/2011 |
| EP | 1 484 234 A1 | 12/2004 |

OTHER PUBLICATIONS

German Search Report issued in counterpart German Application No. 10 2013 208 206.1 dated Sep. 29, 2014 with partial English translation (12 pages).

* cited by examiner

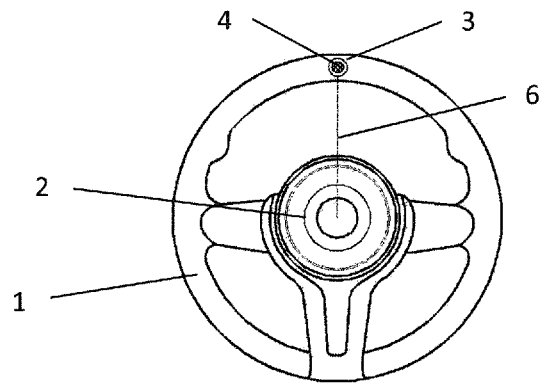
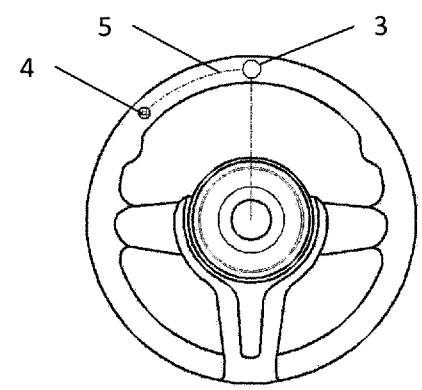
Fig. 1A    Fig. 1B
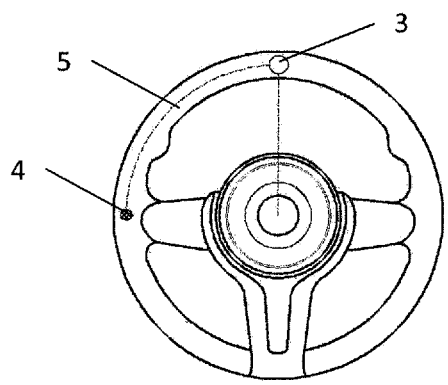
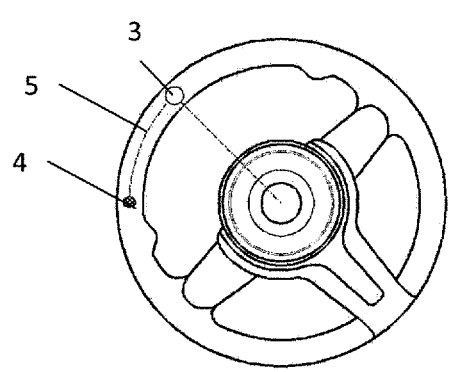
Fig. 1C    Fig. 1D
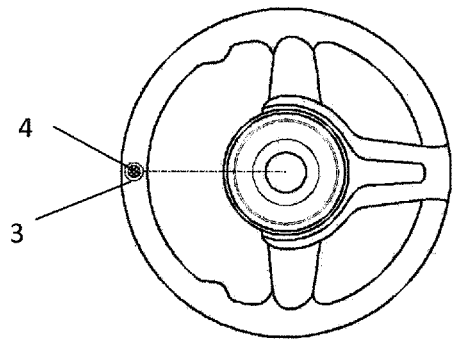
Fig. 1E

DISPLAY DEVICE FOR A VEHICLE FOR INDICATING UPCOMING AUTOMATICALLY PERFORMED STEERING INTERVENTIONS IN A VEHICLE

CROSS REFERENCE TO RELATED APPLICATIONS

This application is a continuation of PCT International Application No. PCT/EP2014/058707, filed Apr. 29, 2014, which claims priority under 35 U.S.C. §119 from German Patent Application No. 10 2013 208 206.1, filed May 6, 2013, the entire disclosures of which are herein expressly incorporated by reference.

BACKGROUND AND SUMMARY OF THE INVENTION

The invention relates to a display device for indicating upcoming, automatically performed, steering interventions in a vehicle.

Prototypes of vehicles which can travel in an automated manner, that is to say plan and carry out driving maneuvers, without the need for human intervention are known nowadays. It can be foreseen that developments in this field will advance and partially or completely automated driving will be used more and more often.

In this case, a passenger in an automatically moving vehicle is initially not included in the decision relating to upcoming driving maneuvers. The passenger is initially unable to gain insight into the state of the calculated upcoming maneuvers and/or to control them. Therefore, a passenger initially cannot assess the safety of the upcoming calculated journey. However, the passenger is naturally exposed to these driving maneuvers, which also concomitantly includes the effect of forces on his body, for example when accelerating, braking, changing lanes or cornering. At the same time, it is often not possible to prepare for these maneuvers, which, for some people, may result in nausea or other adverse effects on health.

A similar situation already arises nowadays with parking assistant systems which are in series production and automatically control the vehicle steering while parking.

The object of the invention is to present the state of the route planning, in particular upcoming steering interventions, to the passenger in a vehicle with automatic steering.

This and other objects of the invention are achieved by a display device for indicating upcoming automatically performed steering interventions in a vehicle, which display device comprises: a vehicle steering wheel; a light strip comprising a plurality of light elements positioned beside one another; wherein the light strip is included and is visible in the vehicle steering wheel; a control device which is coupled to the light strip and is set up for the following: receiving information relating to upcoming automatically performed steering interventions, in particular from a unit for automatically determining upcoming driving maneuvers; and activating light elements of the light strip on the basis of the received information relating to upcoming steering interventions.

In this manner, the planned steering intervention and, therefore, the internal state of the automatic route planning are displayed in an intuitive and comprehensible manner for the passenger. It is therefore possible for the passenger to monitor the safety of at least steering interventions of the automatic route planning. The passenger can therefore prepare himself for the upcoming forces and movements, which reduces the risk of nausea.

The light strip may include a plurality of light elements arranged in a row, similar to a string of elements in a chain. A plurality of parallel strings in the sense of a strip-shaped matrix may also be present. The light elements may be LEDs, OLEDs or similar luminous means known in the prior art. The light strip may also be visible on the steering wheel in the inactive state or else may be arranged behind a covering such that only the respectively active light elements are visible to the passenger.

In one development, the automatic steering intervention includes the automatic rotation of the steering wheel and the selection of light elements includes: determining the number of light elements which are activated on the basis of the magnitude of the rotation of the upcoming steering intervention. A vehicle which carries out driving maneuvers in an automated manner typically also has a steering wheel which can be operated by the passenger. At the same time, this steering wheel is also concomitantly moved, during automatic steering interventions, in a manner corresponding to the degree to which the wheels of the vehicle are turned. In this development, more light elements are activated the greater the magnitude of the upcoming rotation of the steering wheel. This presents upcoming steering interventions in a simple manner and by means of spatial coupling to the steering wheel.

The light strip may be mounted in the steering wheel rim or in the impact absorber of the vehicle steering wheel.

It is often additionally possible for the passenger to override the automatic steering intervention by way of his own actuation (rotation) of the steering wheel, with the result that his actuation predefines the lateral guidance of the vehicle.

In one development, a reference point is predefined on the light strip and a direction of rotation of the steering wheel is assigned to the light elements of the light strip on one side of the reference point. In the event of rotation of the steering wheel in this direction of rotation, the light elements assigned to this direction of rotation are activated. In the event of rotation of the steering wheel in one direction, light elements on the same side of the reference point are therefore respectively activated. The assignment is advantageously carried out in such a manner that, in the event of rotation of the steering wheel to the left, light elements to the left of the reference point are activated and vice versa for a rotation to the right.

The reference point is advantageously selected in such a manner that a vector from the center of the axis of rotation of the steering wheel to the reference point does not have a vector component in the lateral direction with respect to the vehicle when the vehicle is traveling straight ahead. A vector component symbolizes one spatial direction when breaking the vector down into three spatial directions, one of which points in the longitudinal direction of the vehicle, one of which points in the lateral direction and one of which points vertically upward. The reference point therefore does not have a lateral deviation and symbolizes traveling straight ahead. In a typical implementation, in the case of a steering wheel position for traveling straight ahead, the reference point is at the highest point of the steering wheel rim or is vertically below it.

In one particularly advantageous further development, in the event of rotation of the steering wheel, the reference point is rotated in a manner corresponding to the rotation of the steering wheel. This means that the reference point moves like the steering wheel, that is to say appears to be attached to the latter. At the same time, the light elements are activated in such a manner that, during the rotation of the steering wheel, they indicate the upcoming position of the reference point. In this case, the upcoming position may relate to a predetermined time (for example 1 s, 2 s or 5 s) in the future. The upcoming position of the reference point simultaneously represents the upcoming position of the steering wheel or upcoming rotation of the steering wheel in this case. The light elements may be activated such that light elements which are between the reference point and the position of the reference point at a predetermined time in the future, in particular at a time of 1 s, 2 s, 3 s or 5 s in the future, are activated. A path of activated light elements which will be followed by the reference point therefore exists for the user. In this case, provision may be made for the light elements to be gradually deactivated as soon as the reference point has passed over the respective light element during rotation. In other words, only the path of the reference point between the current position of the reference point and the upcoming position of the reference point is marked by activating the light elements on this path. The growth of the light path over time is therefore correlated with the rotational movement of the steering wheel over time and has only a temporal offset. Light elements may be continuously activated and deactivated in this case. That is to say the activation of the light elements is always updated in short periods, for example every 0.01 s, 0.05 s, 0.1 s, 0.2 s or 0.5 s.

Other objects, advantages and novel features of the present invention will become apparent from the following detailed description of one or more preferred embodiments when considered in conjunction with the accompanying drawings.

BRIEF DESCRIPTION OF THE DRAWINGS

FIGS. 1A to 1E schematically show a steering wheel with indication of upcoming steering interventions according to one exemplary embodiment of the invention;

Identical reference symbols denote corresponding elements across the figures.

DETAILED DESCRIPTION OF THE DRAWINGS

Figure 2:
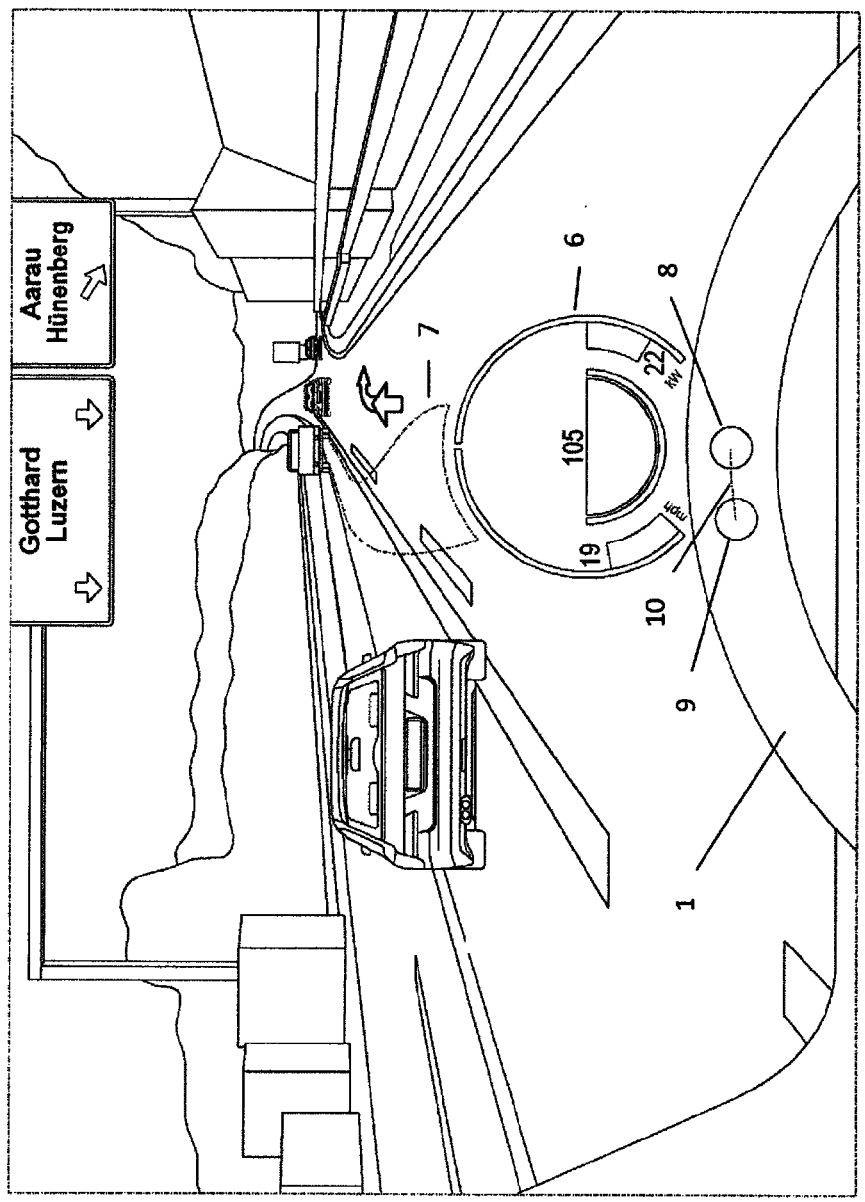
FIG. 2 schematically shows an exemplary view, as is displayed to a passenger during fully automatic driving, according to one exemplary embodiment of the invention.

FIGS. 1a to 1e schematically show a steering wheel 1 at successive times from the point of view of a passenger with indication of upcoming steering interventions according to one exemplary embodiment. In the example in FIG. 1a, the steering wheel 1 is initially in a position in which the vehicle is traveling straight ahead. A steering intervention according to which the steering wheel 1 is rotated through 90° is then carried out. The end position of the steering wheel 1 is shown in FIG. 1e.

In FIG. 1a, the steering wheel 1 is in a position which corresponds to when the vehicle is traveling straight ahead. The circular steering wheel rim includes a light strip which is covered in a semi-transparent manner, with the result that only activated light elements are visible to the passenger in the vehicle. The light strip is an elongated matrix of light elements, the matrix being arranged along the steering wheel rim and therefore describing a circle, just like the steering wheel rim. It would generally also be contemplated to use a chain of LEDs for the light strip, which LEDs are arranged at a distance of approximately 2 cm, for example. The center of the steering wheel contains the impact absorber 2 which accommodates an airbag and the surface of which is movable, with the result that a horn can be activated using the latter.

The vector from the center of the axis of rotation of the steering wheel to the reference point on the light strip is depicted using the reference symbol 6. The vector to the reference point does not have a lateral component in FIG. 1a. The reference point is marked by activating a plurality of light elements which form a circular or annular marker, such as a ring 3, in the center of which the reference point is situated. A circle 4 is marked at the same time. The center of the circle 4 is always situated where the reference point will be situated in a predefined period in the future, that is to say, in the present example, where the reference point will be situated in 2 s in the future. In the present case, the steering wheel 1 will rotate from a position of traveling straight ahead to a position with an angle of 90° to the left in comparison with the position of traveling straight ahead within 2 s. A left-hand bend is therefore being traveled on. FIG. 1a shows the situation 4 s before the 90° position of the steering wheel is reached, here at the time t=0 s.

FIG. 1b shows the steering wheel 1 at the time t=1 s. The circle 4 has migrated approximately 45° to the left (in the counter clockwise direction) on the steering wheel rim. At the same time, a thin strip of light elements is activated between the circle 4 (that is to say the upcoming position) and the ring 3. This thin strip 5 represents the path which the circle 3 will have passed through in the next 2 s. The passing-through need not be uniform and need not begin immediately, as is also the case in the example in FIGS. 1a to 1e.

FIG. 1c shows the steering wheel 1 at the time t=2 s. The circle 4 has now migrated approximately a further 45° to the left on the steering wheel rim and is now at the position of 90. The thin strip 5 has also accordingly lengthened.

FIG. 1d shows the situation at the time t=3 s. The steering wheel has rotated from a position of 0° to a position of approximately 45° in the last second, that is to say the position indicated by the circle 4 in FIG. 1b. Light elements which have been passed over by the reference point or are no longer on the path are deactivated. In other words, the thin strip 5 always illuminates only the path between the circle 4 and the ring 3. The circle 4 has remained stationary in comparison with FIG. 1c since the steering wheel will not rotate further from this position in the next 2 s.

FIG. 1e shows the steering wheel 1 at the time t=4 s. The steering wheel has now been rotated by 90° and will remain there for at least the next 2 s. Accordingly, a path which will be passed over by the ring 3 or the reference point is not displayed. The circle 4 and the ring 3 are above one another.

FIG. 2 schematically shows an exemplary view, as is displayed to a passenger during fully automatic driving, according to one exemplary embodiment. A vehicle is situated on a four-lane freeway not far from an exit (to Aarau). The freeway is being repaired, which is why there are various lane markings at the same time, for example dashed median strips and two arrows which are virtually on top of one another on the right-hand lane shortly before the exit. Despite this traffic situation which is difficult to discern, the vehicle has calculated an upcoming route in a fully automatic manner, which route is displayed to the driver in a contact-analog manner by way of the dashed contour 7. The route carries out a lane change to the left-hand lane. An information display relating to the speed and other operating states of the vehicle is also situated in the driver's field of view. The imminent steering intervention is displayed to the driver on the steering wheel 1 with the aid of a matrix strip of light elements. For this purpose, the reference point of the steering wheel 1 is marked by activating light elements in the circle (ring) 8. Furthermore, the circle 9 represented by activated light elements indicates the position which will be reached by the reference point 8 at a certain time in the future, here 2 s in the future. Light elements are activated between the two circles 8 and 9, which light elements therefore mark the path which will be passed over by the circle (ring) 8 in future.

Figure 3:
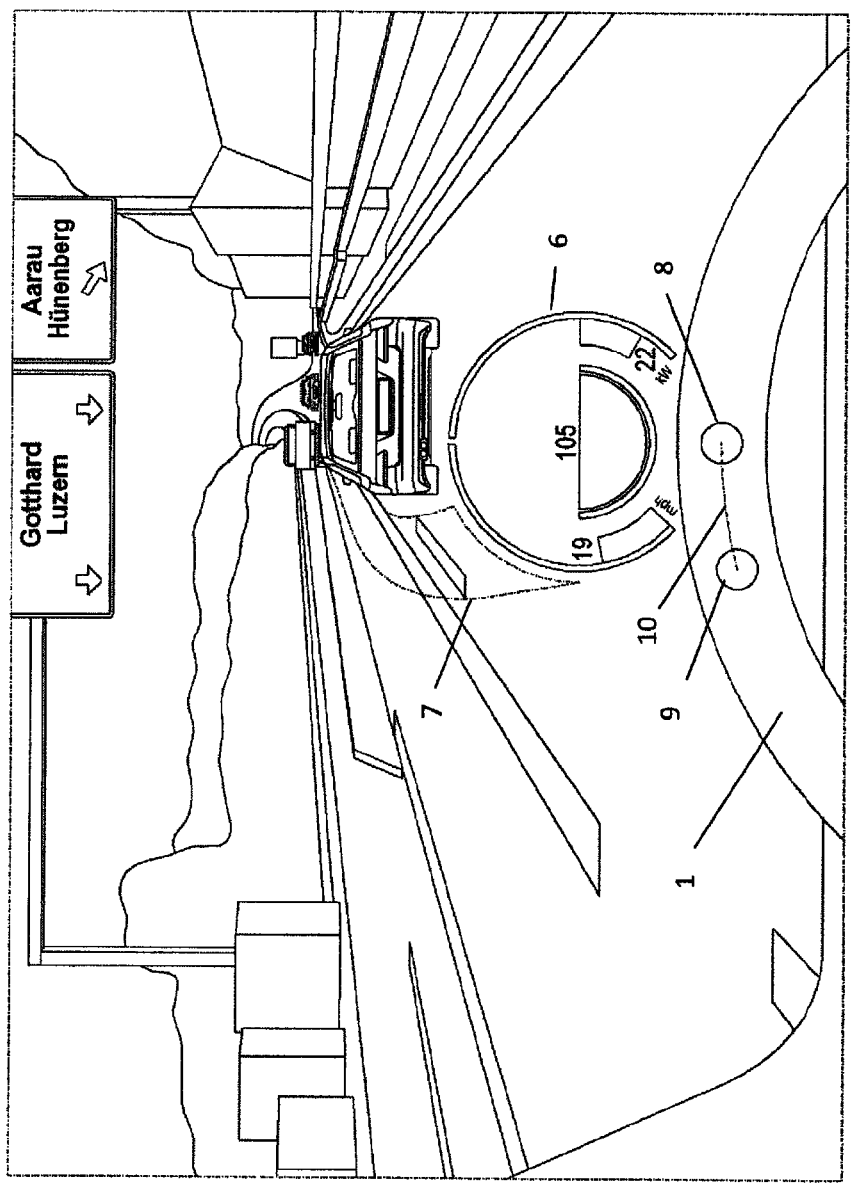
FIG. 3 schematically shows an exemplary view, as is displayed to a passenger during fully automatic driving, according to another exemplary embodiment of the invention.

FIG. 3 schematically shows an exemplary view, as is displayed to a passenger during fully automatic driving, according to one exemplary embodiment. The vehicle is situated at the same location on the same freeway as in FIG. 2; only the traffic situation is different. An automatic steering intervention as in FIG. 2 is also imminent in FIG. 3. However, this intervention is clear earlier and to a greater extent than from the upcoming route depicted in a contact-analog manner, depicted with contour 7. Accordingly, the circle 9 which marks the upcoming position of the reference point has migrated further to the left than in FIG. 2.

The foregoing disclosure has been set forth merely to illustrate the invention and is not intended to be limiting. Since modifications of the disclosed embodiments incorporating the spirit and substance of the invention may occur to persons skilled in the an, the invention should be construed to include everything within the scope of the appended claims and equivalents thereof.

What is claimed is:

1. A display device for indicating an upcoming, automatically performed steering intervention in a vehicle, comprising:
    a vehicle steering wheel;
    a light strip comprising a plurality of light elements positioned beside one another, the light strip being included in the vehicle steering wheel so as to be visible; and
    a control unit operatively coupled to the light strip, the control unit receiving information relating to the upcoming automatically performed steering intervention in the vehicle and activating certain light elements of the light strip based on the received information relating to the upcoming automatically performed steering intervention in the vehicle.

2. The display device according to claim 1, further comprising:
    an automatic upcoming driving maneuver determination unit, the automatic upcoming driving maneuver determination unit providing the information relating to the upcoming automatically performed steering intervention to the control unit.

3. The display device according to claim 2, wherein
    a reference point is predefined on the light strip, the reference point being marked by activating one or more of the light elements, and
    a direction of rotation of the steering wheel is assigned to the light elements of the light strip on one side of the reference point, wherein in an event of rotation of the steering wheel in the direction of rotation, the light elements assigned to the direction of rotation are activated.

4. The display device according to claim 1, wherein
    the upcoming automatically performed steering intervention comprises an automatic rotation of the steering wheel, and
    the activating of certain light elements of the light strip comprises a determination of the number of light elements activated based on a magnitude of the automatic rotation of the steering wheel.

5. The display device according to claim 4, wherein
    the reference point is selected such that a vector from a center of a rotational axis of the steering wheel to the reference point does not have a vector component in a lateral direction with respect to the vehicle when the vehicle is traveling straight ahead.

6. The display device according to claim 5, wherein
    in an event of rotation of the steering wheel, the reference point is rotated in a manner corresponding to the rotation of the steering wheel, and
    the light elements are activated such that, during the rotation of the steering wheel, the light elements indicate an upcoming position of the reference point.

7. The display device according to claim 6, wherein the upcoming position of the reference point is indicated via an annular or circular marking.

8. The display device according to claim 6, wherein light elements located between the reference point and the upcoming position of the reference point at a predetermined future time are activated, as a result of which a movement is displayed.

9. The display device according to claim 8, wherein the predetermined future time is a time of one, two, three, four or five seconds in the future.

10. The display device according to claim 8, wherein light elements that have been passed over by the reference point are deactivated.

11. The display device according to claim 1, wherein the light elements are continuously activated according to a lateral guidance of the vehicle in a predetermined future time period.

12. The display device according to claim 11, wherein the predetermined future time period is a time period of one, two, three, four or five seconds in the future.

* * * * *